United States Patent [19]

Anzai

[11] Patent Number: 5,206,859
[45] Date of Patent: Apr. 27, 1993

[54] ISDN MULTIMEDIA COMMUNICATIONS SYSTEM

[75] Inventor: Masaki Anzai, Tokyo, Japan

[73] Assignee: NEC Corporation, Tokyo, Japan

[21] Appl. No.: 649,862

[22] Filed: Feb. 5, 1991

[30] Foreign Application Priority Data

Feb. 5, 1990 [JP] Japan .................................. 2-26467

[51] Int. Cl.$^5$ .............................................. H04J 3/12
[52] U.S. Cl. .................................. 370/110.1; 370/77;
379/54; 358/85
[58] Field of Search ..................... 370/110.1, 94.1, 112,
370/62, 77; 379/54, 93, 96; 358/85, 86

[56] References Cited

U.S. PATENT DOCUMENTS

| | | | |
|---|---|---|---|
| 4,787,085 | 11/1988 | Suto et al. | 370/110.1 |
| 4,961,185 | 10/1990 | Sawad | 370/110.1 |
| 4,995,071 | 2/1991 | Weber et al. | 358/85 |
| 4,998,248 | 3/1991 | Matsuzaki | 370/110.1 |

Primary Examiner—Douglas W. Olms
Assistant Examiner—H. Kizou
Attorney, Agent, or Firm—Foley & Lardner

[57] ABSTRACT

In a multimedia communication terminal, a CPU generates a mode identifier and subsequently a switching signal in response to a command input as well as in response to receipt of an incoming mode identifier. Frame synchronization circuitry multiplexes an outgoing digital video signal from a video codec with the mode identifier into an outgoing composite video signal, and demultiplexes an incoming composite video signal from a distant terminal into a mode identifier and a digital video signal. In response to the switching signal, the terminal is switched from video to data communication mode by coupling a LAPB controller to an ISDN interface so that the CPU can exchange computer data and/or a mode identifier with the distant terminal without frame sync. Due to the elimination of frame sync, the terminal can access a database through the ISDN network. The terminal is switched from data to video communication mode by coupling the LAPB controller to the interface via the frame synchronization circuitry so that the video codec exchanges composite video signals with the distant terminal. During the video mode, the synchronization circuitry supplies an incoming data mode identifier to the CPU via the LAPB controller and the CPU supplies an outgoing data mode identifier to the synchronization circuitry via the LAPB controller.

9 Claims, 4 Drawing Sheets

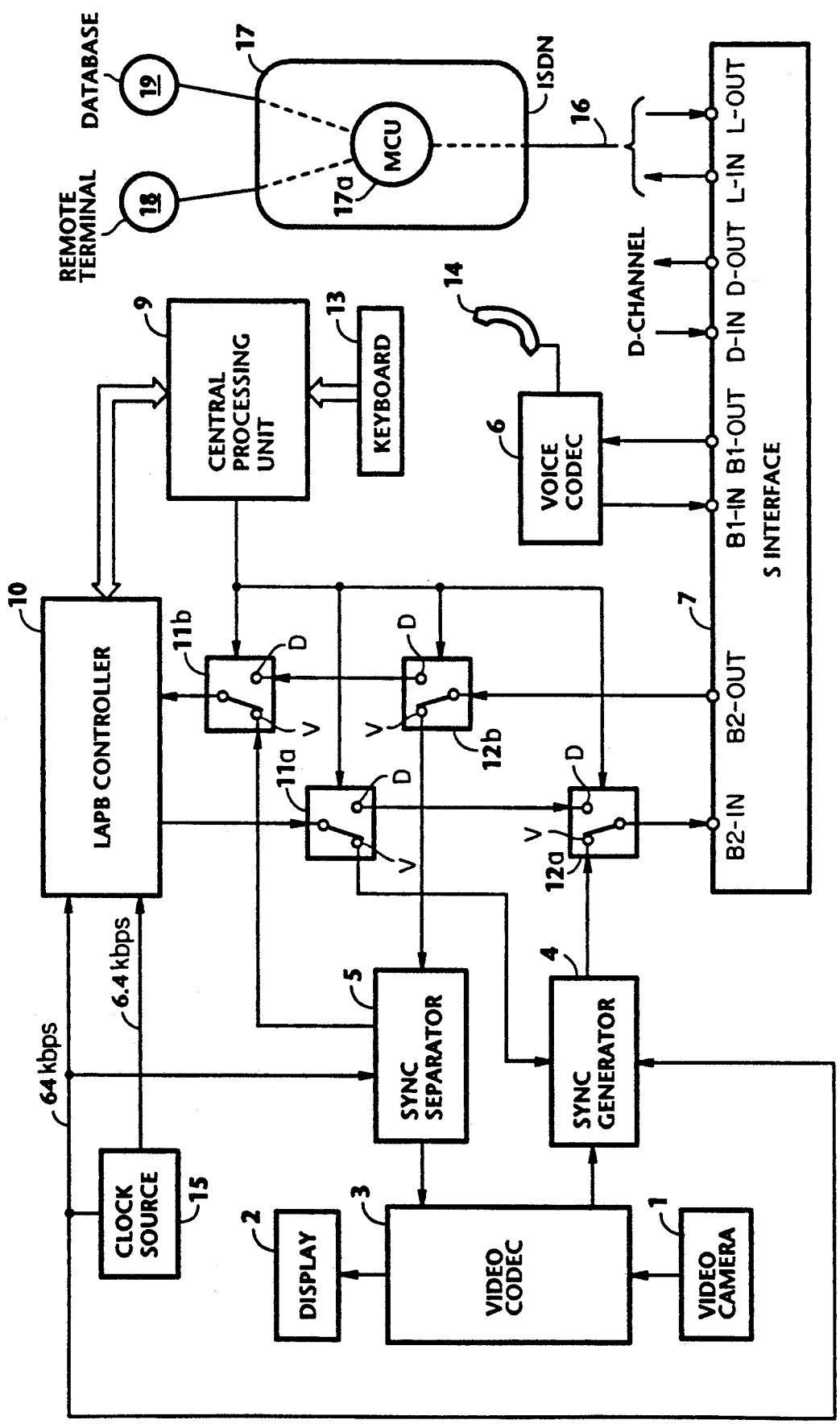

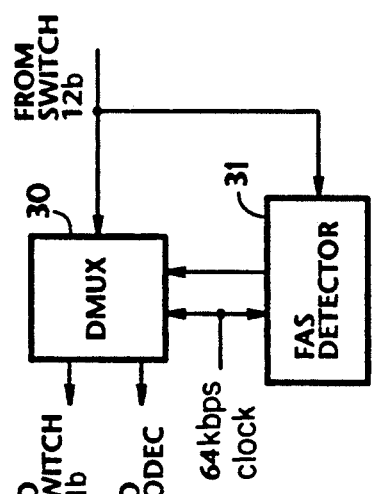
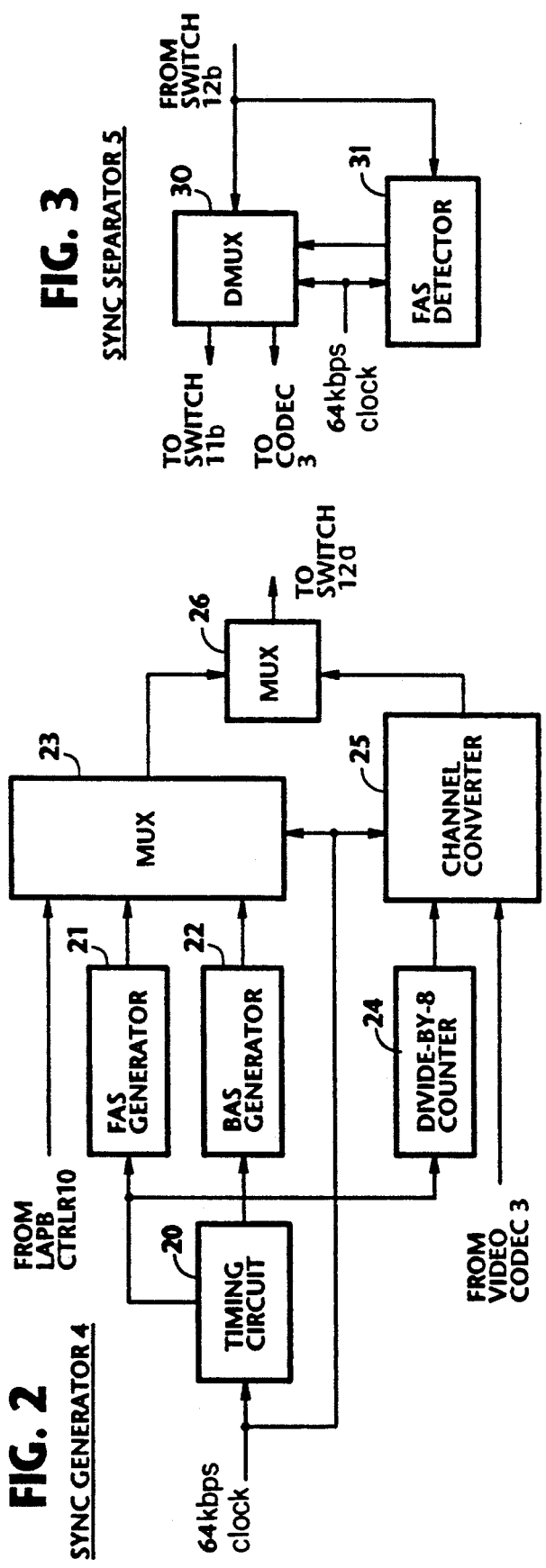
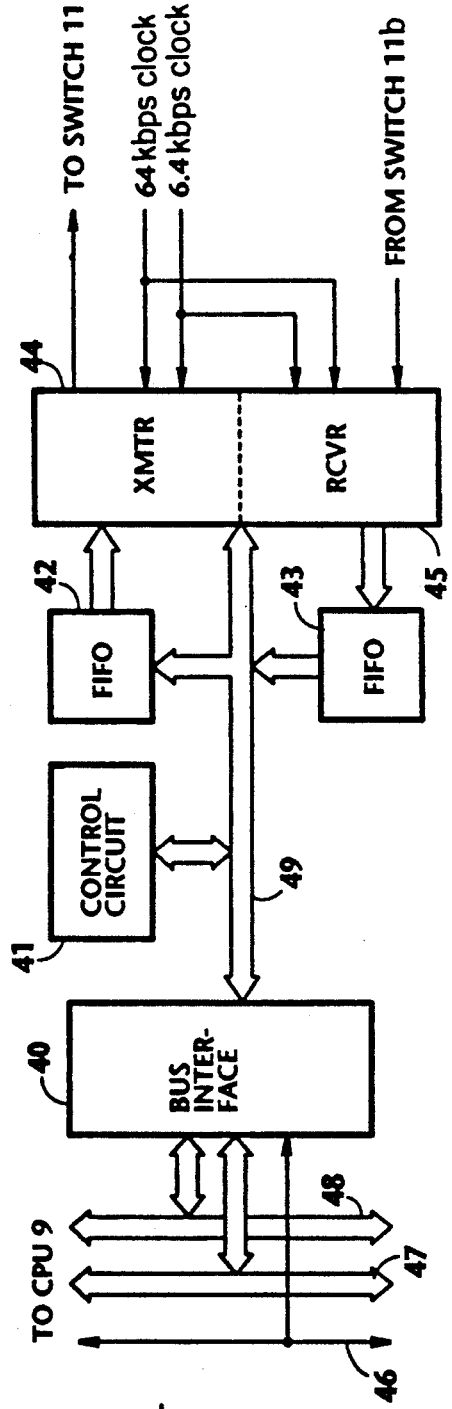

ISDN MULTIMEDIA COMMUNICATIONS SYSTEM

BACKGROUND OF THE INVENTION

The present invention relates generally to communications systems, and more specifically to an ISDN (integrated services digital network) multimedia communications system.

According to the current ISDN multimedia communications system, each multimedia terminal station of the system comprises a central processing unit, a video codec, a voice codec, and an ISDN interface. In addition, two LAPB (link access procedure balanced) controllers are used, one for transmitting a mode switching identifier during a transition between different modes and the other for exchanging computer-generated data during data communication mode. Frame synchronization circuitry is included to encapsulate all signals between frame sync codes. During a data communication mode, the central processing unit is linked through one of the LAPB controllers and through the frame synchronization circuitry to the interface and during a video communication mode the video codec is linked through the frame synchronization circuitry to the interface. When switching the mode of operation from video to data, the second LAPB controller is briefly switched into connection with the frame synchronization circuitry by disconnecting the video codec from it, and a data mode identifier is generated by the central processing unit and applied through the second LAPB controller and encapsulated into a specified time slot of a video frame.

Multimedia communications systems are often used as a teleconferencing system. In such applications, there is a need to access a database during video communication mode. However, the frame format of the transmitted signal prevents the terminal from accessing the database. In addition, the use of two LAPB controllers adds an extra cost to the terminal station.

SUMMARY OF THE INVENTION

It is therefore an object of the present invention to provide an ISDN multimedia communications terminal station which is capable of accessing a database by briefly interrupting a video communication mode.

This object is obtained by switching the user side of an ISDN interface between synchronization circuitry and a single LAPB controller in response to a mode switching signal from the central processing unit, so that frame sync codes are removed from data signals.

According to the present invention, there is provided a multimedia communications terminal station comprising a central processing unit, a LAPB (link access procedure balanced) controller coupled to the CPU, and an ISDN interface which is coupled to an ISDN network. The central processing unit is responsive to a video-to-data mode switching command from a keyboard for generating an outgoing data mode identifier and subsequently a video-to-data mode switching signal, and responsive to a data-to-video mode switching command from the keyboard for generating an outgoing video mode identifier and subsequently a data-to-video mode switching signal. In addition, the video-to-data mode switching signal and data-to-video mode switching signal are also generated respectively in response to receipt of an incoming data mode identifier and an incoming video mode identifier from a distant station. A video codec is provided for generating an outgoing digital video signal and decoding an incoming digital video signal. Frame synchronization circuitry multiplexes the outgoing digital video signal with the outgoing data mode identifier to generate an outgoing composite video signal, and demultiplexes an incoming composite video signal from the distant station into the incoming data mode identifier and a digital video signal which is supplied to the video codec. Switches are responsive to the video-to-data mode switching signal for coupling the LAPB controller to the ISDN interface for allowing the central processing unit to exchange computer-generated data as well as the incoming and outgoing video mode identifiers with the distant station in a non-framed format, and responsive to the data-to-video mode switching signal for coupling the LAPB controller to the interface via the frame synchronization circuitry for allowing the video codec to exchange the outgoing and incoming composite video signals with the distant station, allowing the synchronization circuitry to supply the incoming data mode identifier to the central processing unit via the LAPB controller and allowing the central processing unit to supply the outgoing data mode identifier to the synchronization circuitry via the LAPB controller.

Since the frame synchronization circuitry is disconnected from the LAPB controller during data communication mode, frame sync codes are not contained in the data signals exchanged between the central processing units of communicating stations. Therefore, databases can be accessed through the ISDN network by briefly switching the system from a video communication mode to a data communication and back to the video communication mode after necessary data are obtained from the databases. In addition, the use of a single LAPB controller enables implementation of a less costly multimedia terminal station.

BRIEF DESCRIPTION OF THE DRAWINGS

The present invention will be described in further detail with reference to the accompanying drawings, in which:

FIG. 1 shows in block form a multimedia communications terminal station of the present invention;

FIG. 2 shows details of the sync generator of FIG. 1;

FIG. 3 shows details of the sync separator of FIG. 1;

FIG. 6 shows details of the LAPB controller of FIG. 1.

DETAILED DESCRIPTION

Figure 4:
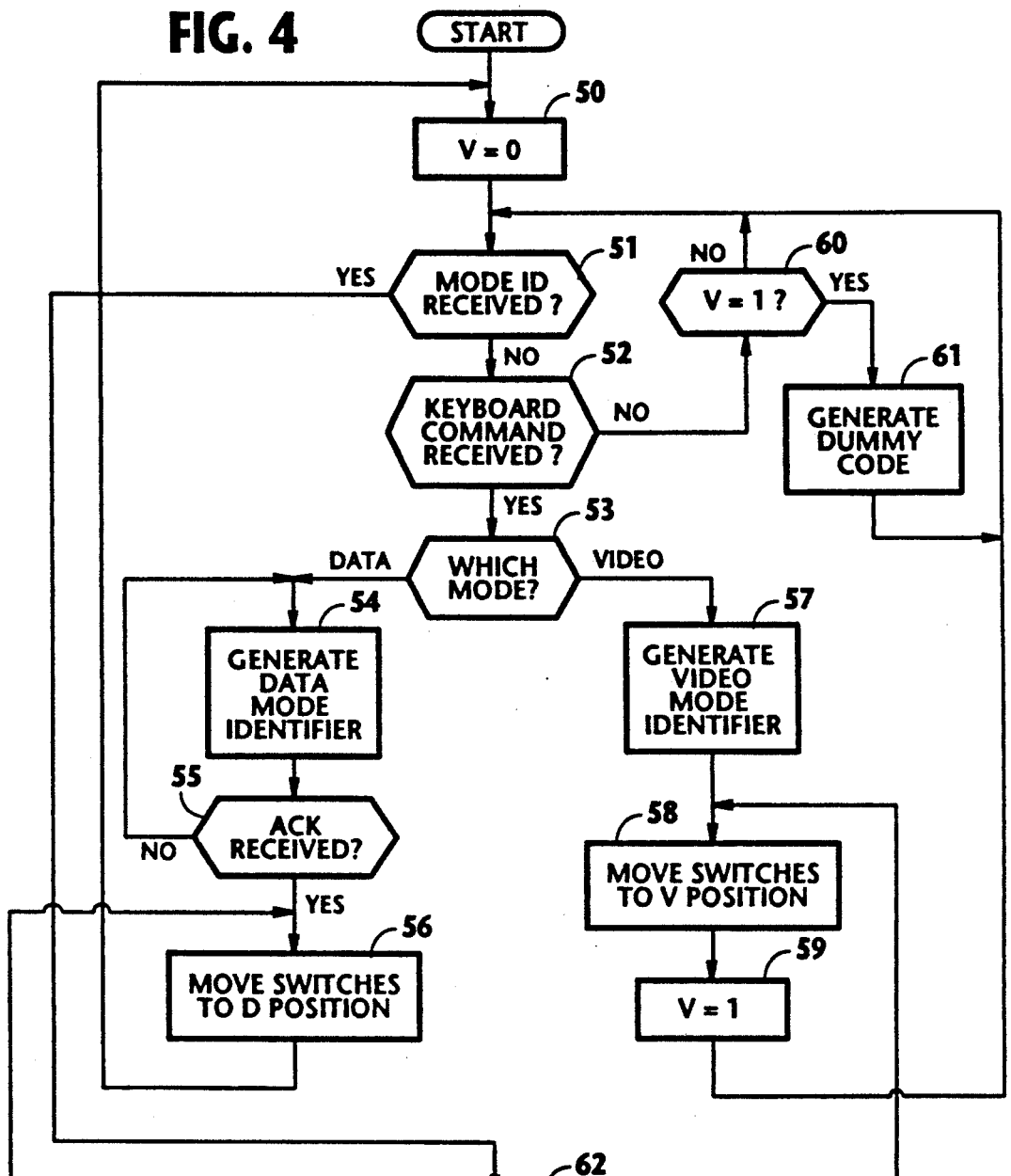
FIG. 4 is a flowchart of instructions performed by the central processing unit of FIG. 1 when the system is switched between different operational modes.

Referring now to FIG. 1, there is shown a multimedia communications terminal station according to an embodiment of the present invention. The terminal station is connected through a two-way channel of an ISDN network to a distant station of identical construction.

The central processing unit 9 of a personal computer is associated with a LAPB (link access procedure balanced) controller 10 which is implemented with an LSI (large-scale integration) circuit and generates a data frame which complies with the CCITT Recommendation X.25. CPU 9 receives typed-in data and command signals from a keyboard 13 and supplies LAPB controller 10 with computer-generated data during data communication mode. During video communication mode, CPU 9 generates a dummy code and LAPB controller 10 inserts it into the control field of a video multiframe according to the X.25 LAPB protocol. When it is desired to change from video to data communication mode for exchanging computer-generated data with the distant station or accessing a database in a different location by interrupting the video mode, CPU 9 generates a data-mode identifier and LAPB controller 10 inserts it into the control field of the video multiframe. When it is desired to change the mode of operation from data to video, CPU 9 generates a video-mode identifier and LAPB controller 10 multiplexes it with computer-generated data from CPU 9.

In order to effect switching between different modes of operation, switches 11a, 11b, 12a and 12b are provided, each having a video position V and a data position D. Following the transmission of a mode identifier to a distant station, CPU 9 waits for an acknowledgment signal returning from the distant station. On receiving the acknowledgment, CPU 9 controls these switches 11a, 11b, 12a and 12b between the V and D positions.

An S-interface 7 is provided in compliance with the ISDN layer 1 to transmit and receive signals in the 2B+D format as specified by the CCITT Recommendation I-430. Specifically, interface 7 has a B2-input terminal for receiving an incoming 64-kbps video signal from the line input terminal (L-IN) and a B2-output terminal for transmitting the video frame signal to the line output terminal (L-OUT), a B1-input terminal for receiving an incoming 64-kbps voice signal, a D-channel input terminal and a D-channel output terminal for 16-kpbs signals. All transmit signals are converted by S interface 7 from the NRZ (nonreturn to zero) format to the AMI (alternate mark inversion) format for polarity insensitivity and spectral shaping, and all receive signals are converted from AMI to NRZ format.

The line input and output terminals of the interface 7 are connected by transmission lines 16 to an integrated services digital network 17 through which the station accesses a remote station 18 and/or a database 19 using a multipoint control unit 17a.

Figure 5:
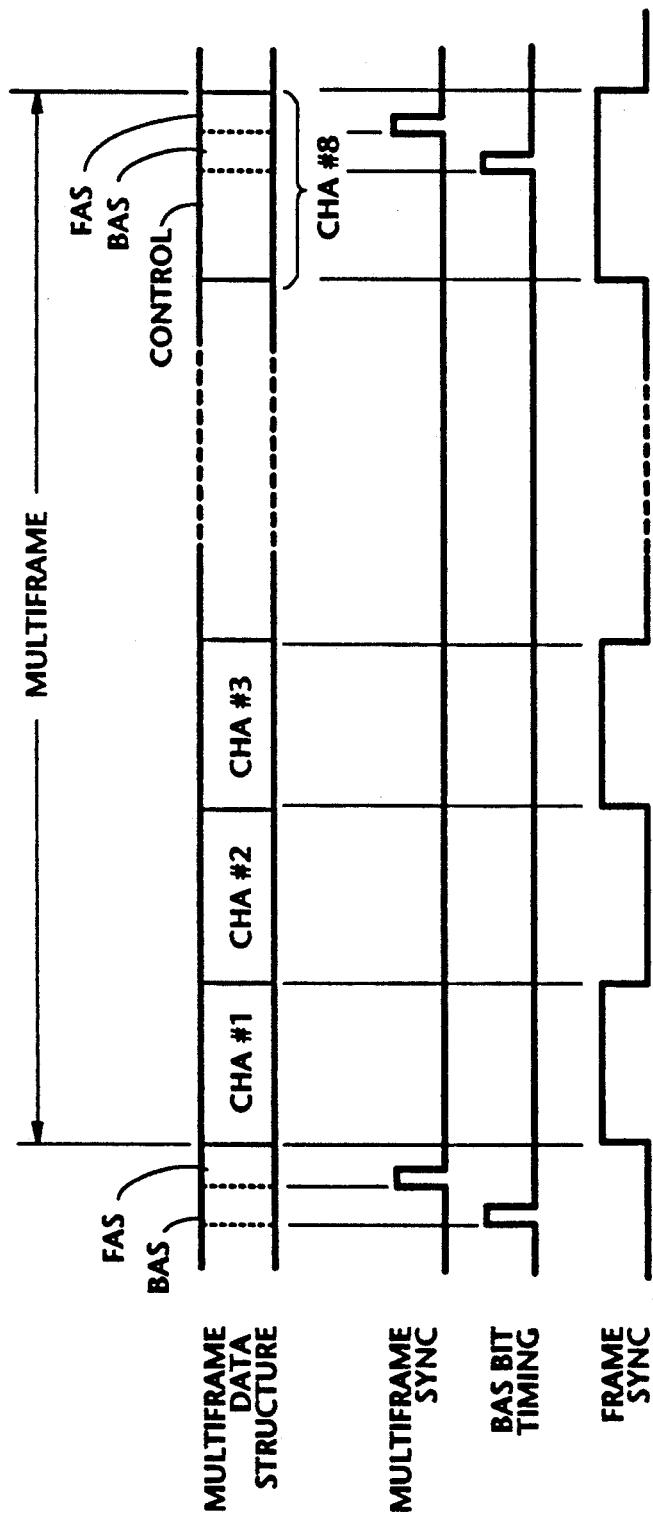
FIG. 5 shows the data structure of the video signal and timing waveforms.

The terminal station comprises a video camera 1 and a display 2 both of which may be located in a teleconferencing room, for example. Video camera 1 supplies analog video images to a video codec (coder-decoder) 3 of the type as shown in U.S. Pat. No. 4,460,923 in which it is converted to digital form using prediction coding and decoding techniques. The digital video signal is fed into a sync generator 4. Sync generator 4 produces a 64-kbps outgoing composite multiframe video signal by time-compressing the input signal to produce a 56-kbps video signal and decomposing it into seven video sigments each with 160 octets (20 milliseconds), inserting them into the first to seventh channels, or frames of the composite multiframe signal, and inserting into the eighth channel a 6.4-kbps control signal (including the mode identifier signal), a 0.8-kbps bitrate allocation signal (BAS) and a 0.8-kbps frame alignment signal (FAS). The signals in the eighth channel are generated by LAPB controller 10 and supplied through the V position of switch 11a to sync generator 4. The output of sync generator 4 is therefore an 8-channel multiframe format as shown in FIG. 5 and applied through the V position of switch 12a as an outgoing B2-channel signal to the B2-input of the S-interface.

A voice codec 6 is provided to transform a B1-channel voice signal from the handset 14 into a 64-kbps digital signal and applies it to the B1-input terminal of interface 7. An incoming B-1 channel digital voice signal from the distant station is supplied from the B1-output terminal of interface 7 and converted into analog form by voice codec 6 for coupling to handset 14.

As shown in FIG. 2, sync generator 4 comprises a timing circuit 20 which counts 64-kbps clock pulses from a clock source 15 and generates a multiframe sync pulse (see FIG. 5) and supplies it to a FAS generator 21 and to a divide-by-8 counter 24. Timing circuit 20 further supplies a BAS generator 22 with a timing pulse which occurs at the same rate as, but is slightly advanced with respect to, the multiframe pulse. A bitrate allocation signal is generated at multiframe intervals, and immediately following it, a frame alignment signal is generated. The outputs of FAS and BAS generators 21, 22 are multiplexed with a control signal supplied from LAPB controller 10 by a multiplexer 23 at the rate of 64 kbps clock pulses supplied from clock source 15 to form an eighth channel of the multiframe format. The output of divide-by-8 counter 24 defines the channel intervals. The outputs of video codec 3 and divide-by-8 counter 24 are fed into a channel converter 25 in which the video signal is time-compressed and divided into segments corresponding to the channel intervals and inserted to the channels #1 through #7 of the multiframe format, respectively. The outputs of multiplexer 23 and channel converter 25 are combined by a multiplexer 26 into a 64-kbps composite digital video signal and supplied through switch 12a to the B2 input terminal of S-interface 7.

Returning to FIG. 1, incoming video signal appearing at the B2-output terminal of interface 7 is fed through switch 12b into a sync separator 5 in which it is decomposed into a seven-channel digital video signal and a control channel. As shown in FIG. 3, sync separator 5 comprises a demultiplexer 30 and a FAS detector 31. 64-kbps clock pulses are supplied from clock source 15 to demultiplexer 30 and FAS detector 31. The latter extracts timing signal from the frame alignment signal of a received video multiframe. Demultiplexer 30 is synchronized with the timing signal to extract signals contained in the control field, which are coupled through switch 11b to LAPB controller 10. The video signal is separated and supplied to video codec 3 in which it is time-expanded and converted to analog form for coupling to display 2.

CPU 9 is programmed to execute instructions described in FIG. 4. Program execution starts with initialization step 50 in which a video-mode flag V is set to zero. Exit then is to decision step 51 which checks to see if a mode identifier signal is received from a distant station. If the answer is negative, control exits to decision step 52 to check for the presence of a command input from the keyboard 13 requesting a mode switching. If there is none, exit is to step 60 to check to see if V=1. It V=0, control returns to step 51 to repeat the process and if V=1, control moves to step 61 to generate a dummy code, with control returning to step 51.

If an affirmative decision is made in step 52, exit is to decision step 53 to determine which operational mode is indicated by the keyboard command. If it requests a video-to-data mode switching, control exits to operations step 54 and generates a data mode identifier and supplies it to LAPB controller 10. Control proceeds to step 55 to check for the presence of an acknowledgement signal from the distant station. If the answer is negative, control repeats steps 54 and 55. If the answer is affirmative in step 55, control proceeds to step 56 to move the contacts of switches 11a, 11b, 12a and 12b to the D position, switching the operation of the station to data mode, and then control returns to step 50 to reset flag V to zero if it has been set to 1.

If the keyboard command requests a data-to-video mode switching, control exits to operations step 57 and generates a video mode identifier and supplies it to LAPB controller 10, and control exits to step 58 to move the contacts of switches 11a, 11b, 12a and 12b to the V position, switching the operation of the station to video mode. Exit then is to step 59 to set flag V to 1, and control returns to step 51 to repeat the above process.

If a mode identifier signal is received from the distant station, control exits from step 51 to step 62 to check its contents. If it requests a data mode, control goes to step 63 to generate an acknowledgment signal and supplies it to LAPB controller 10, and control goes to step 56 to move all switches to the D position. If the received mode identifier requests a video mode, control proceeds to step 58 to move all switches to the V position.

Figure 4A:
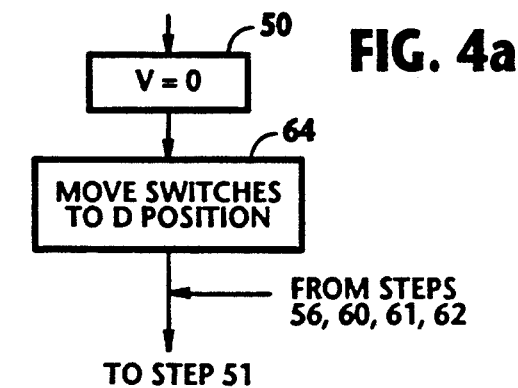
FIG. 4a is a modification of the flowchart of FIG. 4.

As shown in FIG. 4a, the station can be initially set to data communication mode by moving all switches to the D position (step 64) following the execution of step 50.

Details of LAPB controller 10 is illustrated in FIG. 6. LAPB controller 10 is made up of a bus interface 40, a high-speed control circuit 41 which operates at a rate higher than 64 kbps, first-in-first-out memories 42, 43, a transmitter 44 and a receiver 45. Bus interface 40 is connected to CPU 9 via an address bus 46, a data bus 47 and a control line 48 and further connected through an internal bus 49 to control circuit 4, FIFO 42 and 43, transmitter 44 and receiver 45.

The operation of the terminal stations will best be understood with the following description.

During a video communication mode, all switches of each communicating terminal station are in their V position, coupling LAPB controller 10 to sync generator 4 and sync separator 5 (FIG. 1). The video codec 3 of each station is coupled through sync generator 4 and separator 5 to that of the remote station to exchange 64-kbps digital video signals of the ISDN frame format. Control circuit 41 of LAPB controller 10 (FIG. 6) receives a dummy code from CPU 9 via data bus 47 and supplies it to FIFO 42. Transmitter 44 is clocked with 6.4 kbps clock pulses from the clock source 15 to send the dummy code through switch 11a to the multiplexer 23 of sync generator 4 (FIG. 2) at proper timing so that it is inserted to the control field of channel #8 of a video multiframe. At the distant station, the dummy code is separated by sync separator 5. Receiver 45 is clocked at 6.4 kbps to store the signal into FIFO 43. At proper timing, the stored signal is fed through bus 49 and bus interface 40 to CPU 9, which recognizes that a dummy code is received and invokes no control sequence.

During data communication mode, all switches of the communicating stations are in their D positions, directly coupling LAPB controller 10 to the S-interface so that the CPU 9 of each terminal station is transparently coupled to the CPU of the other station via LAPB controller 10. Transmitter 44 and receiver 45 are clocked with 64 kbps clock pulses from the clock source 15 to exchange computer-generated data in packet format at the B2-channel rate of 64 kbps.

During a transition from video to data communication mode, the CPU of a master station (the station invoking a mode switching) receives a video-to-data mode switching command from keyboard 13. Transmitter 44 and receiver 45 are synchronized with 6.4 kbps clock pulses to receive the data mode identifier from CPU 9 and send a 6.4-kbps data mode identifier signal in accordance with the LAPB protocol to sync generator 4 in which it is inserted into the control field of a video multiframe signal, replacing the dummy code. A video multiframe containing the data mode identifier is sent from the master station to the distant, or slave station. At the distant station, the 6.4-kbps data mode identifier signal is separated and fed into CPU 9, which in turn generates an acknowledgement signal. This acknowledgment signal is inserted to the control field of the video signal and sent back to the master station. Immediately following the transmission of the acknowledgment signal, the CPU of the slave station moves all switches to the D position. On receiving the acknowledgment signal, the CPU of the master station moves all switches to the D position. Since the synchronization circuitry 4,5 are disconnected from interface 7, frame sync is not contained in the signals exchanged between the CPU's. Using the multipoint control unit 17a, the master station is now able to establish a connection to database 19 and clear the connection after necessary information has been obtained.

During a transition from data to video communication mode, the CPU of the master station receives a data-to-video mode switching command from keyboard 13. Control circuit 41 and transmitter 44 are synchronized with 64 kbps clock pulses to receive a video mode identifier from CPU 9 and/or computer-generated data from CPU 9. A 64-kbps packet containing the video mode identifier and/or computer-generated data is applied from LAPB controller 10 to S-interface 7 for transmission to the slave station. Following the transmission of the packet, CPU 9 moves all switches to the V position. At the slave station, the 64-kbps packet is received by LAPB controller 10 and fed into CPU 9, which in turn moves all switches to the V position.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A multimedia communications terminal station comprising:
    a source for generating a video-to-data mode switching command signal and a data-to-video mode switching command signal;
    a central processing unit responsive to said video-to-data mode switching command signal for generating an outgoing data mode identifier indicating that a signal to be transmitted to a distant station is computer-generated data and an outgoing video-to-data mode switching signal, indicating the distant station to switch to a data mode of reception, and responsive to said data-to-video mode switching command signal for generating an outgoing video mode identifier indicating that a signal to be transmitted to the distant station is a video signal and an outgoing data-to-video mode switching signal indicating the distant station to switch to a video mode of reception, said outgoing video-to-data mode switching signal and said outgoing data-to-video mode switching signal being further generated respectively in response to receipt of an incoming data mode identifier and an incoming video mode identifier from said distant station, respectively indicating the terminal station to switch to data and video modes of reception;

LAPB (link access procedure balanced) control means for exchanging signals with said central processing unit;

video coder/decoder means for generating an outgoing digital video signal and decoding an incoming digital video signal;

multiplexer means for synchronously multiplexing said outgoing digital video signal from the video coder/decoder means with said outgoing data mode identifier to generate an outgoing composite video signal;

demultiplexer means for synchronously demultiplexing an incoming composite video signal from said distant station into said incoming data mode identifier and a digital video signal, and supplying the demultiplexed video signal to said video coder/decoder means;

an ISDN (integrated services digital network) interface for interfacing the terminal station with an integrated services digital network to which said distant station is also terminated; and switching means responsive to said outgoing video-to-data mode switching signal for coupling said LAPB control means to said ISDN interface for allowing said central processing unit to exchange computer-generated data and said incoming and outgoing video mode identifiers with said distant station, and responsive to said outgoing data-to-video mode switching signal for coupling said LAPB control means to said interface via said video coder/decoder means to exchange said outgoing and incoming composite video signals with said distant station, allowing said demultiplexer means to supply said incoming data mode identifier to said central processing unit via said LAPB control means and allowing said central processing unit to supply said outgoing data mode identifier to said multiplexer means via said LAPB control means.

2. A multimedia communications terminal station as claimed in claim 1, wherein said video-to-data mode switching signal is generated after said data mode identifier is transmitted to said distant station.

3. A multimedia communications terminal station as claimed in claim 1, wherein said central processing unit further generates an acknowledgment signal in response to receipt of said incoming data mode identifier from a distant station, and generates said video-to-data mode switching signal in response to receipt of said acknowledgment signal from a distant station.

4. A multimedia communications terminal station as claimed in claim 1, wherein said LAPB control means is formed by an LSI (large scale integration) circuit.

5. A multimedia communications terminal station as claimed in claim 1, further comprising voice coder/decoder means connected to said ISDN interface for decoding an incoming voice digital signal from said distant station via said interface and transmitting an outgoing voice digital signal to said distant station via said interface, said interface multiplexing said outgoing voice digital signal with said outgoing composite video signal for transmission to said distant station and demultiplexing signals from said distant stations into said incoming voice digital signal and said incoming composite video signal.

6. A multimedia communications terminal station as claimed in claim 1, wherein said central processing unit generates a dummy code containing a specified bit sequence during a period between the time at which said outgoing data-to-video mode switching signal is generated and the time at which said outgoing video-to-data mode switching signal is generated, said multiplexer means multiplexing the dummy code with said outgoing digital video signal during said period so that the multiplexed dummy code occupies the same signal position of the outgoing composite video signal as said outgoing data mode identifier.

7. A multimedia communications system comprising a plurality of terminal stations interconnected by an integrated services digital network to which a database is also connected, each of said terminal stations being operable as a data terminal for exchanging computer-generated data with a distant station or accessing said database during a data communication mode and operable as a video terminal for exchanging digital video signals with said distant station during a video communication mode, each of said terminal stations comprising:

a source for generating a video-to-data mode switching command signal and a data-to-video mode switching command signal;

a central processing unit responsive to said video-to-data mode switching command signal for generating an outgoing data mode identifier indicating that a signal to be transmitted to a distant station is computer-generated data and an outgoing video-to-data mode switching signal, indicating the distant station to switch to a data mode of reception, and responsive to said data-to-video mode switching command signal for generating an outgoing video mode identifier indicating that a signal to be transmitted to the distant station is a video signal and an outgoing data-to-video mode switching signal indicating the distant station to switch to a video mode of reception, said outgoing video-to-data mode switching signal and said outgoing data-to-video mode switching signal being further generated respectively in response to receipt of an incoming data mode identifier and an incoming video mode identifier from said distant station, respectively indicating the terminal station to switch to data and video modes of reception;

LAPB (link access procedure balanced) control means for exchanging signals with said central processing unit;

video coder/decoder means for generating an outgoing digital video signal and decoding an incoming digital video signal;

multiplexer means for synchronously multiplexing said outgoing digital video signal from the video coder/decoder means with said outgoing data mode identifier to generate an outgoing composite video signal;

demultiplexer means for synchronously demultiplexing an incoming composite video signal from said distant station into said incoming data mode identifier and a digital video signal, and supplying the demultiplexed video signal to said video coder/decoder means;

an ISDN (integrated services digital network) interface for interfacing the terminal station with said integrated services digital signal network to which said distant station is also terminated;

voice coder/decoder means connected to said ISDN interface for decoding an incoming voice digital signal from said distant station via said interface and transmitting an outgoing voice digital signal to said distant station via said interface, said interface multiplexing said outgoing voice digital signal with said outgoing composite video signal for transmission to said distant station and demultiplexing signals from said distant stations into said incoming voice digital signal and said incoming composite video signal; and switching means responsive to said outgoing video-to-data mode switching signal for coupling said LAPB control means to said ISDN interface for allowing said central processing unit to exchange said computer-generated data and said incoming and outgoing video mode identifiers with said distant station and to access said database, and responsive to said outgoing data-to-video mode switching signal for coupling said LAPB control means to said interface via said multiplexer and demultiplexer means for allowing said video coder/decoder means to exchange said outgoing and incoming composite video signals with said distant station, allowing said demultiplexer means to supply said incoming data mode identifier to said central processing unit via said LAPB control means and allowing said central processing unit to supply said outgoing data mode identifier to said multiplexer means via said LAPB control means.

8. A multimedia communications system as claimed in claim 7, wherein said central processing unit further generates an acknowledgment signal in response to receipt of said incoming data mode identifier from a distant station, and generates said video-to-data mode switching signal in response to receipt of said acknowledgment signal from a distant station.

9. A multimedia communications system as claimed in claim 7, wherein said central processing unit generates a dummy code containing a specified bit sequence during said video communication mode, said multiplexer means multiplexing said dummy code with said outgoing digital video signal during said video communication mode so that the dummy code occupies the same time slot position of the outgoing composite video signal as said outgoing data mode identifier.

* * * * *